United States Patent Office 3,164,787
Patented Jan. 5, 1965

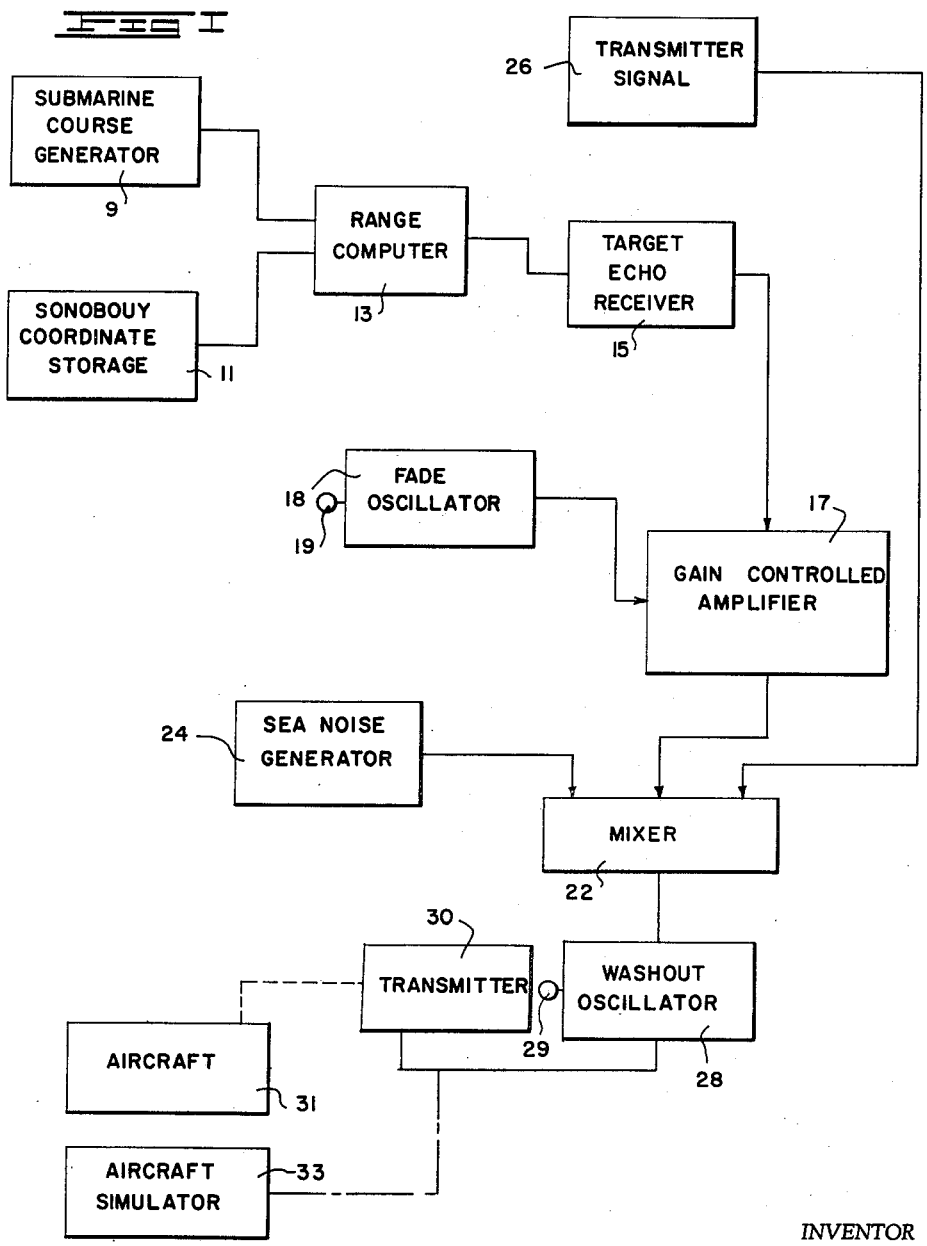

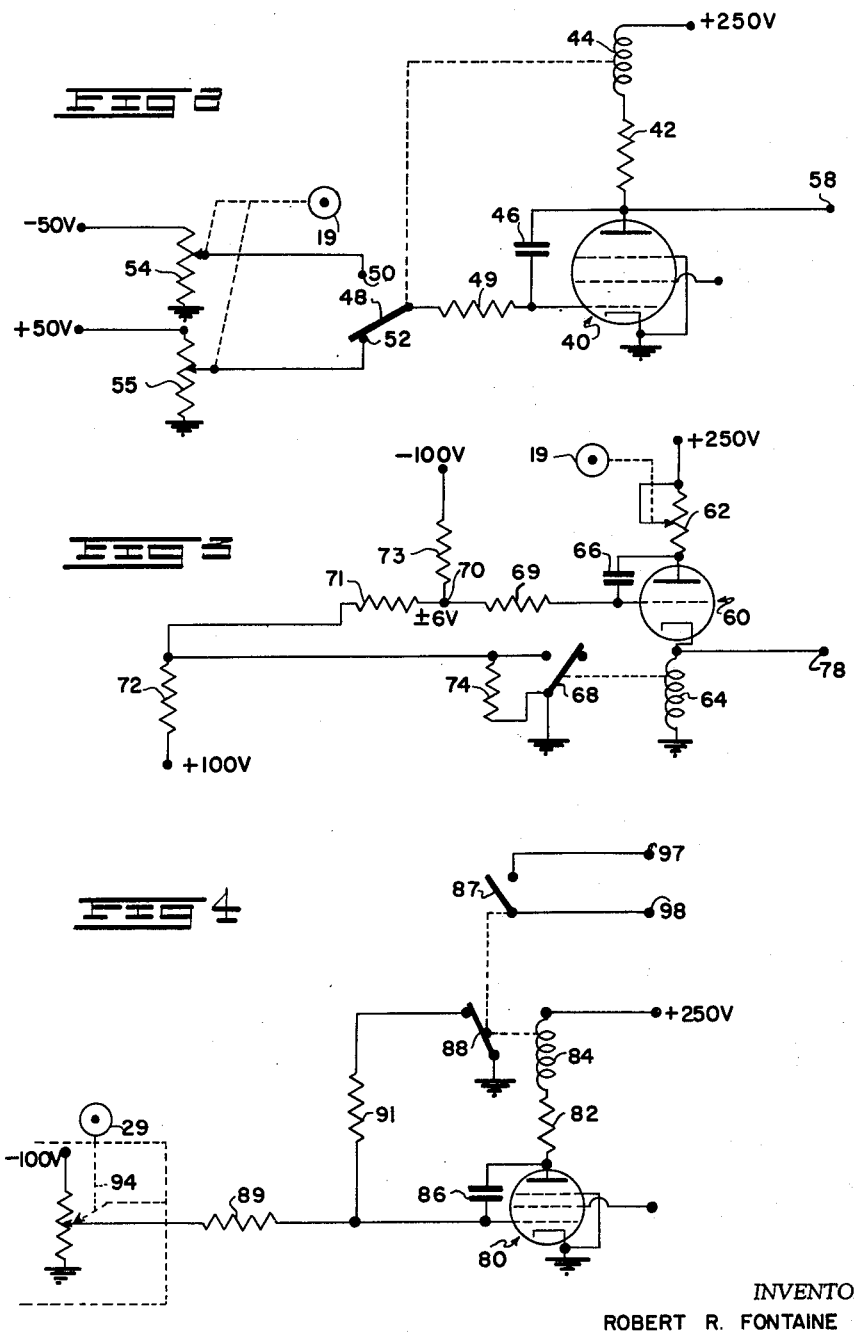

3,164,787
SONOBUOY SIMULATOR
Robert R. Fontaine, East Riverdale, Md., assignor to ACF Industries, Incorporated, New York, N.Y., a corporation of New Jersey
Filed July 15, 1960, Ser. No. 43,228
3 Claims. (Cl. 331—143)

This invention relates to training devices and, in particular, to importantly improved simulated sonobuoy training equipment.

The sonobuoy is a floating buoy which includes a microphone for picking up underwater sounds and a radio transmitter for the transmission of such sounds to a receiving set in an aircraft, or other craft. The sonobuoy may be of the echo ranging type employing an underwater transducer mechanism for the transmission of underwater sound pulses and receiving target reflected echoes at time intervals corresponding to the target range. This intelligence, including the target ranging, is included in the buoy radio transmitter signal to show target distance from the buoy and this may also be readily indicated in patrol planes and trainers for each particular sonobuoy by visual display. When a submarine is known to be in a certain area, a patrol plane is enabled to drop a pattern of sonobuoys and tune in on any buoy of the pattern in order to pick up submarine sounds for detecting, maintaining contact and following the course of the submarine while preparing for an attack or other desired action. Successful use of this sonobuoy type system of submarine location by the crew of a patrol plane calls for the development of a very specialized skill by fully qualified crew members who must be thoroughly trained in this art. Each such crew must be able, instantly, to distinguish a variety of sounds, including the identification of sounds or displays thereof made by submarines as compared to those of surface vessels and then to automatically so react as not to miss or lose contact with the proper submarine target. As part of the mission of such plane crews, they must be able to estimate the range, change in range and speed of the submarine from the sound and visual display indicator in order to accurately gauge position as required for a successful attack. The group action of the crew must be very closely correlated as based upon the proper interpretation of the sounds and displays from the buoys and in the related functioning of all equipment necessary to proper maneuvering and action. The importance of simulator equipment to minimize the use of aircraft, sonobuoys and submarines by the use of simulators for use in this type of crew training is obvious, and this invention relates to critically important improvements in trainers and simulator systems of this type.

Simulator systems may be employed for sonobuoy training that employ apparatus of widely varying design and it is an object of this invention to greatly improve such systems by the introduction thereto of means for producing realistically simulated fade effects periodically experienced by target echo receiver signal operation of the underwater sound transducer as the result of a variety of factors including water current, temperature and the distance to target. An object of the invention is to provide for the automatic production of these periodic fade effects.

It is a further object to provide control means to enable an instructor to vary the automatically produced fade effects in keeping with underwater conditions as they may be actually encountered.

An additional feature of this invention is the incorporation of realistically simulated washout effects in sonobuoy trainer systems, wherein at relatively long periods and for short intervals the sonobuoy radio transmitted signal may be lost or greatly attenuated due to the action of waves on the antenna of the sonobuoy radio transmitter.

A further feature of the invention resides in the provision of novel automatic electronic means for the production of realistic washout effects for object locating trainer systems and also control means to enable an instructor to vary the washout effects in keeping with such sea condition as may actually be encountered.

An additional feature of the invention is in the provision of simplified and novel automatically actuated low frequency cyclic electronic oscillator or timing circuit means together with means for the control of the periodic operation thereof.

Other objects and features of the invention will be apparent and readily understood by reference to the following specification and to the embodiments thereof as illustrated in the accompanying drawings wherein:

FIG. 1 is a block diagram illustrative of sonobuoy simulator systems of the present invention.

FIGS. 2 and 3 represent two diagrammatic embodiments of the controlled and automatically actuated electronic timing circuits of the invention which may be employed as fade oscillator units.

FIGS. 4 and 5 represent two diagrammatic embodiments of the controlled and automatically actuated electronic timing circuit means of the invention and which may be employed as washout oscillator units.

Figure 5:
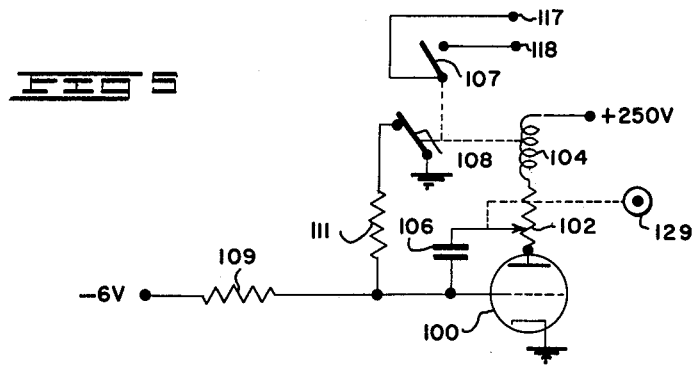

FIG. 1 in block diagram form illustrates a sonobuoy simulator system of the present invention. A simulated submarine position and course generator unit 9 is employed by the instructor to set up and establish the speed, heading and initial position of the simulated submarine. Simulated sonobuoys are then positioned and standard memory devices employed to keep track of their positions in the sonobuoy coordinate storage unit 11. The outputs from the submarine course generator 9 and sonobuoy coordinate storage unit 11 are fed to the range computer 13 wherein the distance output indications between each sonobuoy and the submarine target are then fed to the range computer unit 13.

The resulting output of the range computer is fed to and controls the operation of the target echo receiver unit 15. The output signal generated by the target echo receiver unit is fed to a gain controlled amplifier 17 and the signal is here modified and controlled by operation of the fade oscillator unit 18 of the present invention. The fade oscillator unit 18 is operated in an automatic and periodic manner to produce a signal that so controls and modifies operation of the gain controlled amplifier 17 as to cause the signal therefrom to periodically fade in a manner realistically representative of the alteration of underwater sounds received by the sound transducer of the sonobuoy due to such factors as sea currents, underwater temperature, depth and distance to target. The fade oscillator unit 18 in and of itself is also a feature of this invention and various modifications of the circuit employed are hereinafter described.

Figure 6:
FIGS. 6, 7 and 8 are oscillograph representations typical of signal wave forms as employed and modified by the simulator fade oscillator circuits of my invention.
Figure 7:
Figure 8:
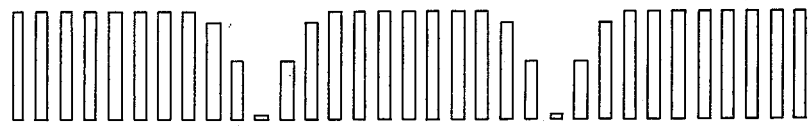

The fade oscillator unit 18 is provided with a control knob 19 for enabling the instructor to vary the frequency of the circuit within a wide range. This range of periodic fading may occur within limits of once in each twenty seconds to a period of once in each twenty minutes. The operation of the fade oscillator unit 18 and of the instructor control knob for varying the period of fading is described in detail hereinafter. The resultant signal from the thus modified gain control amplifier 17 when transmitted to the patrol craft visual and aural receivers, not shown, would be productive of an oscilloscope display as shown in FIG. 8. In actual practice, the time interval between echoes, or pings, here shown in FIGS. 6 and 8 as rectangular pulses would be larger than the time duration of the echoes proper with the time between pulses greatly compressed in order to simplify the drawings. The fading or disappearance of the echo signal is here indicated in FIG. 8 on the scope display by each of the groups of pulses of decreased size. FIG. 6 is representative of the target echo receiver signal in the form of pulses. The signal from the fade oscillator 18 is represented in FIG. 7 as a triangular shaped pulse which, when fed to the gain controlled amplifier 17, modifies the target echo pulse as shown in FIG. 8, and may actually cause the target echo pulse to entirely disappear for periods ranging from approximately five seconds to five minutes.

The gain controlled amplifier output 17 is fed into a mixer unit 22 and this unit also receives the signal from the transmitter unit 26 and from the sea noise generator unit 24. In all echo ranging sonobuoys, the transmitter signals are those received from the sonobuoy. The sonobuoy transmitter signal, for an echo ranging type sonobuoy, represents the time the sound is transmitted into the water and the interval until an additional pulse is received that is representative of the echo and which time interval is an indication of the distance, or range, from the sonobuoy to any particular target including submarines. Sonobuoys may be employed that merely detect undersea sounds, without indication of target range which renders following of the target contact much more difficult.

The sea noise generator unit 24 reproduces pre-recorded signals representative of general underwater sounds and these signals are also fed to the mixer unit 22. This mixer unit combines the signals from the three units.

The output signal from the mixer unit is fed to the washout oscillator unit 28 which is so actuated as to periodically eliminate all signals from the washout oscillator output. This signal output represents the action of waves on the sonobuoy at such times as the entire buoy may be submerged or so acted upon by the sea that no transmitted signals would be available from it to the patrol plane. This washout oscillator unit 28 forms an important part of this invention as does the fade oscillator unit 18 referred to above and both of which represent electronic means which are entirely new, unique and novel, in the production of very realistic simulated sonobuoy effects.

The washout oscillator unit 28 contains a control knob 29 available to the instructor for modifying operation of the oscillator timing period. The loss of signal due to washout will exist for periods of approximately two to three seconds and the interval between signal loss from washout may be varied from approximately fifteen seconds to fifteen minutes by operation of the control knob 29 indicative to changes in sea state caused by wind. The signal representation from the washout unit 28 is as shown in FIG. 8.

The output signal from the washout oscillator may be fed directly to the aircraft simulator unit 33 for guidance of student trainees, or it may be fed to the transmitter unit 30 for radio transmission to patrol aircraft 31 engaged in training purposes.

FIGS. 2 and 3 illustrate two modifications of my invention which may be employed in the fade oscillator unit 18. The circuit of FIG. 2 employs a pentode vacuum tube 40 having a plate resistor 42 and relay operating coil 44 connected from the plate to a power supply of two hundred and fifty volts. A condenser 46 is connected from the plate to the grid of the tube 40 and a single pole double throw switch operated by coil 44, having arms 48 connected through a grid leak resistor 49 to the grid and condenser circuit. The switch 48 is actuated to alternately engage contacts 50 and 52 of a circuit which includes the potentiometer 54 and the battery terminal furnishing a minus fifty volt power supply when the switch arm engages contact 50. When the switch arm is actuated to engage contact 52, a circuit is completed through potentiometer 55, a fifty volt power supply. Each of the potentiometer resistances are controlled by operation of the single control knob 19. The output of the circuit is shown at 58 and is directly connected to the plate.

Before the power is supplied to the circuit switch arm 48 is in contact at 52. When power is first applied to the circuit, the grid bias will be zero and the plate circuit will draw a considerable amount of current. Relay 44 will energize placing contact arm 48 at contact 50. However, because of the capacitor 46 at the grid the potential at the grid cannot assume the bias value at the arm of potentiometer 54 immediately. The rate of change of grid voltage will depend on the value of grid resistor 49, grid capacitor 46, the gain of vacuum tube 40 and the setting of potentiometer 54. As the grid gradually becomes more negative the plate current will decrease correspondingly until relay 44 de-energizes. At this time, grid resistor 49 will be switched to the positive power supply through relay contacts 48 and 52 and potentiometer 55. The grid voltage will then start to increase. Usually the drop out current of the relay is fifty percent or less of its pull in current; therefore, the relay will not pull in as soon as the plate current begins increasing. When the plate current has reached the pull in value of the relay the contact arm 48 will transfer grid resistor 49 to the negative power supply through contact 52 and potentiometer 54. The cycle of operation is thereafter automatically repeated. Changes in plate current during the cycle will produce a voltage drop across resistor 42 and the nature of this voltage wave shape is triangular and available for use at the output 58. This output may be employed in the simulator of my invention. As employed in the fade oscillator unit 18 the components are so designed as to produce a symmetrical output signal wave for periods as indicated above. The output signal wave may be varied by operation of the potentiometer knob 19 for varying the circuit resistance.

FIG. 3 represents a modified circuit that employs a triode vacuum tube, a single potentiometer and one single pole single throw switch. The triode tube cathode is connected to ground through the relay actuating coil 64 which operates the switch arm 68. The plate is connected through potentiometer 62 to a two hundred and fifty volt power supply. The condenser 66 is connected across the plate and grid of the tube 60 and also to series connected resistors 69, 71 and 72 to a one hundred volt power supply terminal. The resistors 69 and 71 are connected by a common terminal 70 to a resistor 73 and a negative one hundred volt power supply terminal. The potentiometer 62 is actuated by the control knob 19. Resistor 74 is connected between resistors 71 and 72 and to ground. Relay 68 is so connected as to short out resistor 74 when in circuit making contact. The circuit output 78 is taken from the cathode of the tube 60. The resistor network composed of resistors 71 through 74 is chosen so that the voltage at point 70 is plus six volts when switch contact 68 is open and minus six volts when switch 68 is closed. In operation and with power supplied to the circuit junction 70 is at plus six volts. The grid of tube 60 will begin going positive and the plate current through the tube will increase until sufficient in value to energize relay 64 and close switch contact 68. Upon closing of switch contact 68 junction 70 will become minus six volts and the grid of tube 60 slowly becomes negative and the current through the tube decreases until relay 64 de-energizes and contact switch arm 68 opens at which time junction 70 returns to plus six volts and the cycle is repeated. The output signal from 78 is suitable for application to the gain controlled amplifier 17 of the simulator system. The symmetrical signal output may be varied in frequency by operation of the potentiometer knob 19.

FIGS. 4 and 5 represent further modifications of the circuits of FIGS. 2 and 3 and may be employed in conjunction with the washout oscillator of the simulator system of my invention.

In FIG. 4 a pentode vacuum tube 80 is employed with plate resistor 82 and relay 84 connected to a power supply of two hundred and fifty volts. Condenser 86 is connected across the plate and grid of the tube. The grid is also connected through resistor 89 to potentiometer 94. The potentiometer is fed by a power supply of minus one hundred volts and is adjustable as a means for controlling the frequency of the oscillation by the knob 29. The grid is also connected to resistor 91 the opposite end of which is connected to relay operated switch contact 88 which relay also operates switch 87, which is connected to input terminal 97 and output terminal 98. In operation, the relay 88 is initially in the position shown and the grid of tube 80 is essentially at zero bias permitting the tube to draw sufficient current to energize relay coil 84 for opening switch contact 88. The grid of tube 80 now starts to become negative due to the action of the voltage on potentiometer 94 as applied to resistor 89. The grid continues in a negative direction until it has reduced the tube current sufficiently to permit relay coil 84 to de-energize and switch 88 to close and ground resistor 91 which causes the grid voltage to build up in a positive direction for repeating the cycle. Resistor 91 is very much smaller than resistor 89 and because of the correspondingly less current limiting capacity the time when the relay is de-energized is much less than when the relay is energized. Relay coil 84 also closes switch contact 87 at the same time it opens switch contact 88. The closure of contact 87 permits the input signal at terminal 97 to pass through the contact 87 and appear at output terminal 98 without alteration of the input signal. The opening of contact 87 interrupts the signal path for the brief time in which this contact is open.

The modified circuit of FIG. 5 employs a triode vacuum tube 100 connected to a plate tube potentiometer 102 and relay coil 104 to a power supply of two hundred and fifty volts. The condenser 106 is connected across the arm of the potentiometer 102 and the grid. The grid is also connected to resistor 109 and to a power supply of minus six volts. The grid is also connected to resistor 111 which is connected to ground through relay operated switch 108. The relay also actuates switch arm 107. In operation, relay contact 108 is closed placing the grid of tube 100 at near ground potential permitting the tube to draw sufficient current to energize relay coil 104 and open switch contact 108. The grid voltage of tube 100 then proceeds in a negative direction under the influence of the minus six volt power supply acting through resistor 109 and this voltage drop continues until the relay 104 causes closure of contact 108 and the cycle is repeated. Relay coil 104 also closes contact 107 at the same time it opens contact 108. Closure of contact 107 completes a circuit from the input 117 through contact 107 and to the output 118 for passage of the signal in unchanged form. When switch contact 108 is closed the operating relay opens switch 107 to interrupt the signal path from 117 to 118. Control of the repetition rate is accomplished by varying the gain of the tube as applied to the plate side of the capacitor 106 thereby changing the effective grid capacity through the adjustment of the knob 129 for the potentiometer 102.

Each of the circuits of FIGS. 2 to 5 represent uniquely novel, simple and inexpensive means for the electronic production of cyclic operations or in the alternative of periodic timing means. It is one outstanding advantage of these inventions that the cyclic operating periods may be of extremely unusual length and may likewise be adjustable over a wide range. For example, the condenser employed in these circuits may be in the order of from fifty times smaller as used in the triode circuits of FIGS. 3 and 5, and may be in the order of one hundred times smaller as employed in the pentode circuits as compared with conventional circuits that might accomplish similar results. The reduction in size and expense of the condenser units is a result of the employment of electron discharge devices in which the device uniquely cooperates with the condenser to provide an effective capacitance in the circuit that is much larger than the physical capacitance of the condenser actually employed or as used in conventional circuits.

Having described preferred embodiments of the present invention, it is to be understood that although specific terms and examples are employed, they are used in a generic and descriptive sense and not for purposes of limitation; the scope of the invention being set forth in the following claims.

What is claimed is:

1. A cyclic operating apparatus comprising an electron discharge tube having a cathode and anode and a control grid in the discharge path between the cathode and anode, a voltage source and a resistor connected in a series circuit between said cathode and anode, a capacitor connected between the anode and grid, a biasing circuit connected between the grid and cathode, said biasing circuit including a resistor and a source of voltage connected in series between the grid and cathode, a relay having a winding connected serially with said voltage source and resistor between the anode and cathode, said relay including switching means operated by said winding and connected to said biasing circuit for changing the bias, and an output circuit connected to the circuit between the anode and cathode for deriving sawtooth voltage pulses therefrom.

2. Apparatus according to claim 1, wherein said biasing circuit includes a second resistor connected serially with said switching means between the grid and cathode.

3. Apparatus according to claim 1, including means for adjusting the value of said resistor for varying the rate of change of the grid bias.

References Cited in the file of this patent
UNITED STATES PATENTS

| | | |
|---|---|---|
| 2,279,007 | Mortley | Apr. 7, 1942 |
| 2,395,679 | Neuhof | Feb. 26, 1946 |
| 2,422,337 | Chilowsky | June 17, 1947 |
| 2,453,743 | Cesareo | Nov. 16, 1948 |
| 2,524,847 | Springer | Oct. 10, 1950 |
| 2,591,810 | Hart | Apr. 8, 1952 |
| 2,694,868 | McMillan et al. | Nov. 23, 1954 |
| 2,881,535 | Harwood et al. | Apr. 14, 1959 |
| 2,887,671 | Frankel et al. | May 19, 1959 |
| 2,923,890 | Spranger | Feb. 2, 1960 |